(12) United States Patent
Raffel et al.

(10) Patent No.: US 6,169,534 B1
(45) Date of Patent: Jan. 2, 2001

(54) GRAPHICAL USER INTERFACE FOR CUSTOMER INFORMATION MANAGEMENT

(75) Inventors: Keith Raffel, Palo Alto; Robert M. Schulman, Atherton; Dixie Ellen Baker, Scotts Valley; Robert E. Currie; Christine Currie, both of San Francisco, all of CA (US)

(73) Assignee: UpShot.com, Mountain View, CA (US)

(*) Notice: Under 35 U.S.C. 154(b), the term of this patent shall be extended for 0 days.

(21) Appl. No.: 08/884,113

(22) Filed: Jun. 26, 1997

(51) Int. Cl.[7] .................................................. G09G 5/36
(52) U.S. Cl. ........................ 345/133; 345/473; 345/474; 345/475
(58) Field of Search .................................... 345/473, 474, 345/475, 33, 35, 140, 36, 133, 118, 440, 441, 356

(56) References Cited

U.S. PATENT DOCUMENTS

| | | | |
|---|---|---|---|
| 3,778,810 | * 12/1973 | Hayashi | 345/133 |
| 3,862,615 | * 1/1975 | Liou | 116/308 |
| 4,937,743 | 6/1990 | Rassman et al. | 364/401 |
| 4,992,929 | * 2/1991 | Yamada et al. | 364/189 |
| 5,146,556 | * 9/1992 | Hullot et al. | 345/348 |
| 5,237,497 | 8/1993 | Sitarski | 364/402 |
| 5,613,057 | * 3/1997 | Caravel | 395/806 |
| 5,739,815 | * 4/1998 | Mizutani | 345/199 |
| 5,801,690 | * 9/1998 | Minakuchi | 345/150 |
| 5,831,617 | * 11/1998 | Bhukhanwala | 345/349 |

FOREIGN PATENT DOCUMENTS 0467584  1/1992  (EP) .

* cited by examiner

Primary Examiner—William A. Cuchlinski, Jr.
Assistant Examiner—Marthe Y. Marc-Coleman
(74) Attorney, Agent, or Firm—Blakely, Sokoloff, Taylor & Zafman LLP

(57) ABSTRACT

A method and apparatus for displaying information regarding an event are provided. The method and apparatus meets objectives of increasing sales and marketing efficiency and efficiency of technical and customer support by providing a multi-dimensional display of event information to a user. As such, a radar screen-like presentation of data is generated that allows the user to see a visual representation of the best prospective opportunities based on the strategic business importance of an event. The method and apparatus functions by determining at least one event to be displayed and generating for graphical display an event object and label corresponding to the event. The radial location of the event object on the display is related to the stage of the particular corresponding event. The location of the event object on the display can also be indicative of other characteristics of the corresponding event. Each event object has variable size, color, and shape, all of which are indicative of characteristics of the corresponding event. In addition, a displayed event object may have an object tail which is indicative of characteristics of the corresponding event. The radar screen-like display may be comprised of sectors, and the location of an event object in a particular sector is indicative of a characteristic of the corresponding event. Each event object provides an electronic link to detailed information about the corresponding event.

114 Claims, 8 Drawing Sheets

| NAME | SIZE | TERRITORY | COMPLETION DATE | STAGE (TODAY*) | STAGE (1 MONTH AGO) |
|---|---|---|---|---|---|
| ABC CORP. | $50,000 | SE | 1/15/97 | 5 | 3 |
| ACME | $150,000 | NW | 2/1/97 | 4 | 1 |
| WIDGETS INC. | $250,000 | NE | 3/1/97 | 3 | 3 |
| XYZ CORP. | $100,000 | SW | 5/1/97 | 2 | 1 |
| TECH LTD. | $200,000 | SW | 4/1/97 | 2 | 3 |
| ZIPPY CO. | $50,000 | NE | 5/1/97 | 3 | 3 |
| SUPER STUFF | $150,000 | SE | 4/1/97 | 2 | 4 |

*ASSUME TODAY IS 1/1/97

510 — SCALE
.25 INCH DIAMETER PER $50,000 DEAL SIZE
.5 INCH DISTANCE FROM CENTER PER 1 MONTH OF LEAD TIME
1 INCH OF TAIL PER STAGE MOVED IN PAST MONTH

520 — NOTES
STAGES ARE FROM 1 TO 5, WHERE 1 IS THE BEGINNING AND 5 IS THE TARGET, SUCH AS GETTING A DEAL BOOKED.

530 — REGIONS ARE GROUPED IN QUADRANTS:
- NW IN TOP LEFT
- NE IN TOP RIGHT
- SW IN BOTTOM LEFT
- SE IN BOTTOM RIGHT

| NAME | SIZE | TERRITORY | COMPLETION DATE | STAGE (TODAY*) | STAGE (1 MONTH AGO) |
|---|---|---|---|---|---|
| ABC CORP. | $50,000 | SE | 1/15/97 | 5 | 3 |
| ACME | $150,000 | NW | 2/1/97 | 4 | 1 |
| WIDGETS INC. | $250,000 | NE | 3/1/97 | 3 | 3 |
| XYZ CORP. | $100,000 | SW | 5/1/97 | 2 | 1 |
| TECH LTD. | $200,000 | SW | 4/1/97 | 2 | 3 |
| ZIPPY CO. | $50,000 | NE | 5/1/97 | 3 - CLOSED | 3 |
| SUPER STUFF | $150,000 | SE | 4/1/97 | 2 | 4 |

*ASSUME TODAY IS 1/1/97

FIG. 2E

| | | |
|---|---|---|
| 402 | NAME: | XYZ CORP. |
| 404 | ADDRESS: | 123 Q STREET |
| | | PALO ALTO, CA 94301 |
| 406 | PHONE: | (415) 321-1234 (MAIN) |
| | | (415) 321-1239 (FAX) |
| 408 | INDUSTRY: | PHARMACEUTICALS |
| 410 | EMPLOYEES: | 1135 |
| 412 | REVENUE (1996): | $177MM |
| 414 | CREDIT RATING: | A |
| 416 | URL: | http:\\www.xyz.com |
| 418 | TERRITORY: | SW |
| 420 | DEAL SIZE: | $100,000 |
| 422 | EXPECTED CLOSE: | 5/1/97 |
| 424 | STAGE (AS OF 1/1/97): | 2 |

FIG. 4

GRAPHICAL USER INTERFACE FOR CUSTOMER INFORMATION MANAGEMENT

FIELD OF THE INVENTION

The invention relates to the field of graphical user interfaces. In particular, the invention relates to a method of presenting event data on a graphics display.

BACKGROUND OF THE INVENTION

In order to facilitate accurate decision making, it is desirable to be able to consider a maximum amount of available information in formulating a decision. Maximizing the amount of available information, however, often increases the difficulty of the decision making process, thereby reducing the accuracy of the corresponding decision. This is because the amount of information to be presented, assimilated, and considered in the making of business decisions can be significant in light of the current information age. Therefore, it is desirable to maximize the information presented to a decision maker while presenting the information in such a way as to be readily understood by the decision maker.

One approach to presenting information is to present raw information or statistics to a decision maker. This approach is generally not preferred because the large amount of time expended by the decision maker in understanding just what information they have is unacceptable.

Another frequently used approach is to organize the material for presentation using graphs and charts of the information. Many different forms of graphs and charts have been used in this approach, depending on the type of information to be presented. This approach can work well if the information is the type that is easily organized in graph or chart form. Again, however, information presented in graphs and charts can be difficult for the decision maker to assimilate, particularly when information relevant to an event must be compared with information relevant to other events.

Often, when there is a need to compare information from numerous events or transactions, there is a requirement to look at the historical statistics of a particular event. When the historical statistics of an event are relevant, it requires the concurrent presentation of historical data of the same type and format as the current data. It becomes extremely difficult to display historical data concurrently with current data in the same format on the same display using traditional graphs and charts. One reason for this difficulty is the limit in space available on a chart or graph. With limited space, for every historical characteristic that is displayed a characteristic of the current data must be deleted. This is especially true in the areas of business transactions, customer support, and sales where there is a large amount of relevant data for each event, and historical event data are critical to efficient decision making by sales and marketing personnel.

Therefore, it is desirable for everyone from the sales and support personnel to the chief executive officer to be able to take a quick look at significant transaction data and make an efficient determination as to the best potential business prospects to pursue or the most serious support problems to fix. Consequently, it is desirable to have an information presentation scheme to increase the efficient presentation of information in the general area of customer information management systems and contact management.

SUMMARY

A method and apparatus for displaying events in a computer system are provided. According to one aspect of the invention, an event is determined for display. An event object is then generated for display corresponding to the event. The corresponding event object is displayed a determined distance from a central point on the display. The determined distance of the displayed event object is representative of one of a number of possible stages of the event. The central point of the display is representative of a final stage of the corresponding event, where the final stage can represent any event goal.

In one embodiment, the event determined for display may be a business transaction, for example a sales deal or a service to be performed. The size, color, and shape of the event objects are each indicative of characteristics of a corresponding event. An event may be displayed as a corresponding animated event object, with the animation showing the progression and regression of the corresponding event over a specified period of time. In addition, a displayed event object may further comprise an object tail. The length and direction of the object tail are each indicative of characteristics of the corresponding event. The display may also be divided into sectors in which the location of an event object in a particular sector is representative of another characteristic of the corresponding event. An event object provides an electronic link to a detail page which contains detailed information relating to the corresponding event.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 2b illustrates the sample data upon which a Radar Screen Opportunity Display implementation is based in an embodiment of the present invention.

FIG. 2e illustrates the sample data upon which a Radar Screen Opportunity Display implementation is based in an embodiment of the present invention.

FIG. 4 illustrates a detail page of an embodiment of the present invention.

DETAILED DESCRIPTION

A method and an apparatus for displaying events in a computer system are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
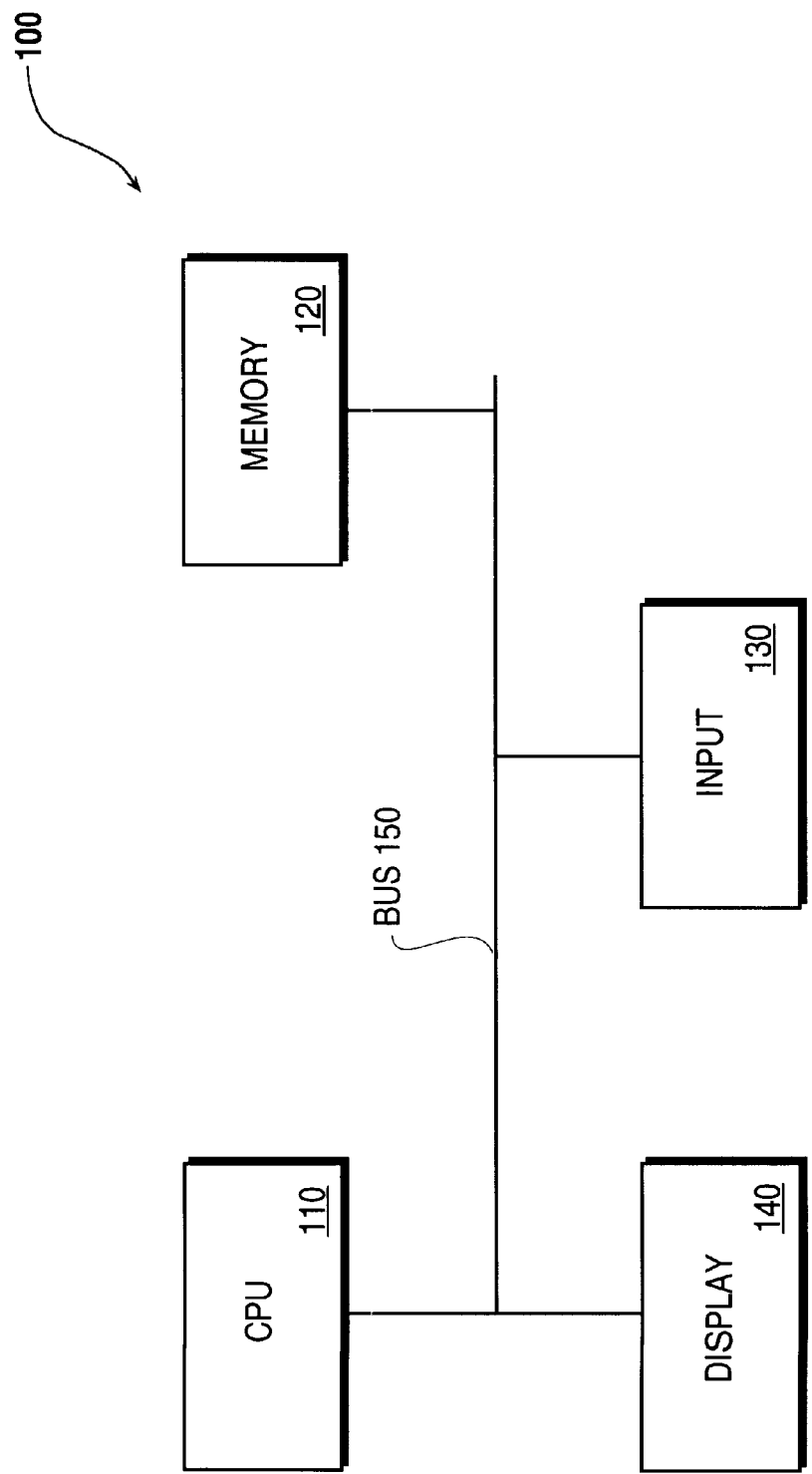
FIG. 1 illustrates an embodiment of a computer system in which the present invention is implemented.

FIG. 1 illustrates a simplified block diagram of an embodiment of a computer system 100 in which the present invention is implemented. The computer system 100 is configured to have a central processing unit (CPU) 110, system memory 120, a display 140, and an input device 130 coupled via a system bus 150. It is readily apparent that the computer system 100 illustrated by FIG. 1 is just one example and a variety of configurations using a variety of devices can be used.

An embodiment of the present invention is the Customer Information Management System (CIMS) for use in the general area of sales force automation, customer support, and contact management products. One objective of the CIMS is to increase sales and marketing efficiency. The CIMS meets this objective by functioning to provide a multi-dimensional display of event information to a user. As such, the CIMS uses a display called the Radar Screen Opportunity Display (RSOD), so named because the display is a radar metaphor. The CIMS uses the RSOD to provide a quick-look of the best business prospects for pursuit by an individual or company. The RSOD depicts business events and transactions in such a manner as to allow a quick and accurate evaluation by the user. Thus, in one embodiment, this radar-like presentation of data allows the user to see a visual representation of the current state of one or more sales transactions.

The CIMS operates on data that is either received via user input or is received from a database containing information relevant to the events of a user company. With reference to FIG. 1, when a database is used the database is hosted in the system memory 120 of the computer system 100. As data entered into the CIMS by a user is stored by the CIMS, all data used by the CIMS will hereinafter be referred to as being resident in the CIMS database. These events can include, but are not limited to, sales deals, purchases, customer service cases, services to be performed, defect tracking, material issues, contact management, and contract progress. The CIMS utilizes the event data to generate corresponding event objects for display. The event data, or event characteristics as they will be referred to herein, are displayed in a graphical manner on the RSOD in the form of the corresponding event objects. Each event object represents an event from the database. The RSOD is capable of displaying multiple event objects at one time representing multiple events from the database. The display characteristics of each event object are determined by the event characteristics of the corresponding event.

The location of an event object on the RSOD is indicative of characteristics of corresponding events. The location is a multi-dimensional indicator in that it can be specified in terms of both a radial location from a specified point and in terms of sectors or coordinates. First, regarding radial location, an event object is displayed on the RSOD a determined distance from a particular reference point on the display. This particular reference point may be chosen by the user. Generally the particular reference point will be chosen to be, but is not limited to, the central point of the display. As business deals are typically referenced by stages in a pipeline or target dates, this reference point can represent, but is not limited to, some particular target stage or target date of an event. Therefore, the determined distance of an event object from the chosen RSOD reference point represents a related stage or date of the corresponding event. Using a sales deal event as an example, and making the RSOD central reference point representative of completion of the sales deal, the distance the event object is displayed from the central point indicates the proximity to completion of the sales deal. This proximity can be represented by a number of predefined stages away from completion of the deal, or alternatively, an estimated time period away from completion of the deal.

Next, while radial location indicates a characteristic of an event, the sector or coordinate location of an event object may be indicative of a different characteristic of a corresponding event. The RSOD may be divided into numerous sectors or, alternatively, grids defined by some coordinate system. Thus, the location of an event object in a particular sector or grid can be representative of some characteristic of a corresponding event. For example, the sector or grid in which an event object is located may identify the geographical area in which a corresponding event is located, or it may identify the personnel involved in the event, or the probability of event completion, or product line, or type of company, or type of problem.

As the location of an event object on the RSOD can indicate temporally-related event characteristics, then the corresponding event objects can be animated to show the progression and regression of the corresponding events over time. The specified time period for animation can be selected by the user or may be set by the CIMS. Event objects will not obstruct other event objects.

An embodiment of the present invention uses the size, color, and shape of event objects to be indicative of characteristics of corresponding events. Generally, the size of an event object will be chosen to be indicative of a measure of importance of a corresponding event. This measure of importance may be, but is not limited to, the amount of money involved in a corresponding event. For example, an event of interest may be a sales deal where the measure of importance is the monetary value of the sales deal, so the size of the displayed event object would be in direct proportion to the monetary value of the sales deal. While the size of event objects is a quantitative attribute for continuous values, the color and shape of event objects is suited for discrete values.

The size, color, and shape of event objects will each be indicative of an individual characteristic of a corresponding event. These characteristics may include, but are not limited to, the personnel involved in an event, the level of priority of an event, the type of event, the geographical area in which an event is located, the strategic importance of an event, a product line that is the subject of an event, event probability of completion, and an event with the highest probability of completion. For events related to customer support or defect tracking, these characteristics may also include the severity of a problem, the number of interactions with a customer, the number of instances of a problem, the support representative or team assigned to a problem, the type of problem, the type of customer, the product or product line, or the release version of a product.

In order to increase the number of event object variables so as to increase the number of event characteristics which may be displayed, the event objects may have variable fill patterns. For example, an event object may be displayed with a hollow center to represent a lost or failed event.

In order to further increase the number of event object variables so as to increase the number of event characteristics which may be displayed, the event objects may have tails. As with event object location, the event object tail is a multi-dimensional indicator of corresponding event characteristics in that the tail has a variable length and a variable pointing direction. For example, the direction in which the object tail points may indicate whether the event is progressing towards or regressing away from a specified date or stage while the length of the object tail may represent a speed at which the corresponding event is progressing or regressing relative to the specified date or stage. Additionally, the object tail may contain tail end symbols or different types of tails which are indicative of a different characteristic of a corresponding event.

Preferably, the CIMS is configurable for individualized use so as to provide information relevant to a specific user's position in the company. In this way, the CIMS can provide a visual representation of data presented for a specific person, team, or region, as well as for the entire company. Thus, for example, a sales person may view his individual deals displayed on the screen, while the chief executive officer or vice president of sales might see all deals of the entire company displayed on the screen. In this way, the CIMS can function to present event information so as to increase sales and marketing efficiency at all levels of a company. Also, a user can configure the CIMS to select event data based on any standard database queries including, but not limited to, monetary value, product line, time period, or other event characteristics. In addition, the event objects displayed on the RSOD provide electronic links to detail pages which contain detailed information relative to corresponding events.

Figure 2A:
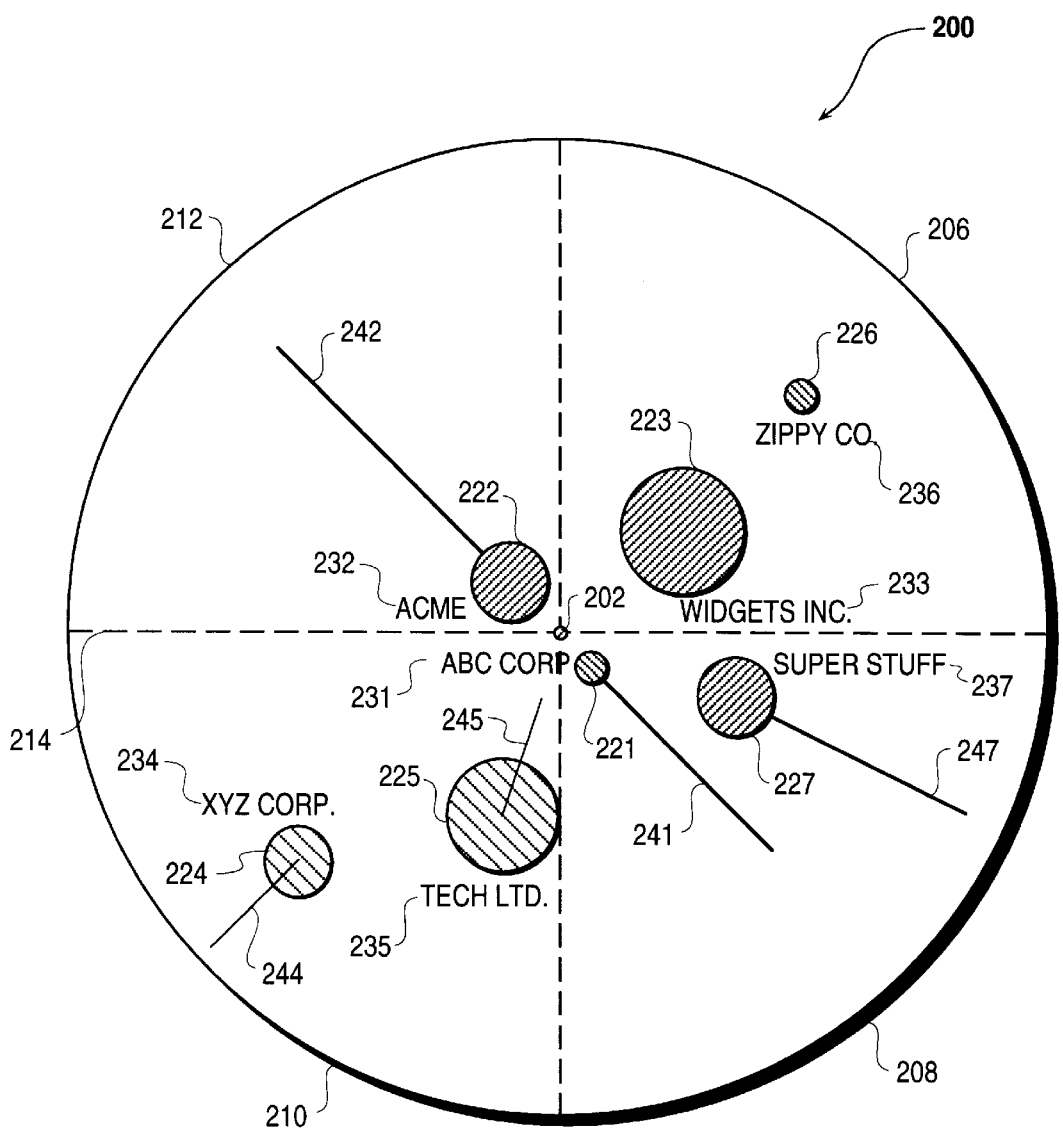
FIG. 2a illustrates an embodiment of a Radar Screen Opportunity Display implemented by the present invention.

FIG. 2a illustrates an embodiment of a Radar Screen Opportunity Display (RSOD) 200 implemented by the present invention. The RSOD 200 of this embodiment is circular in shape. The RSOD 200 displays event objects 221–227 which correspond to events of the CIMS database or user input. FIG. 2b illustrates a sample table 250 of event characteristics 254–262 upon which the RSOD 200 implementation of FIG. 2a is based in an embodiment of the present invention. The sample table 250 contains event characteristics 254–262 for seven events 270–282 illustrated by example on the RSOD 200. The event characteristics 254–262 of this embodiment include, in addition to an event name 252, five categories of event characteristics 254–262 relating to each event.

The data selected for presentation in FIG. 2b is by way of representation, and the event name 252 and event characteristics 254–262 are not limited to the type or amount of data shown. The CIMS may operate on any event characteristic that is selected for input into the database. As such, a CIMS database may receive and store a large number of event characteristics. In contrast, the amount of data displayed on the RSOD is limited to the number of event object variables accommodated by the RSOD. Accordingly, an event object shown on an RSOD display will not generally be based on all information in the CIMS database corresponding to a particular event. The reason is that the CIMS database will generally contain more event characteristics corresponding to a particular event than the event object will have variable parameters. Therefore, the CIMS must limit the characteristic event data displayed corresponding to an event to the number of variable parameters of the corresponding event object.

The user of the CIMS has options as to the event data displayed by the RSOD in the form of the event objects. The user may choose to select characteristic event data for all corresponding event object variables. If the user elects not to select characteristic data to represent all event object variables, the CIMS will select the remaining characteristics using a default routine. If the user selects a number of characteristics for display that is less than the number of event object variables, then the CIMS may be configured to either cause the RSOD to display the event objects based just on the characteristics chosen by the user, or to cause the CIMS to select the remaining event characteristics to be displayed using the default routine. The default routine selection of characteristics could be based on a number of factors including, but not limited to, a prioritized list of default characteristics, or default characteristics most often selected by other users of the CIMS.

The event characteristics table 250 of this embodiment presents event characteristics 254–262, by company name 252, in five categories. These five categories correspond to company size 254, event territory 256, event completion date 258, event stage as of the current date 260, and event stage as of one month ago 262. These event characteristics represent characteristics of the event or transaction with the particular named company 252. The size characteristic 254 presents the size of the event in dollar value. The territory characteristic 256 presents the geographical location of the event. The completion date characteristic 258 represents the anticipated date of completion of the event. The stage (Today) characteristic 260 represents the stage of the deal as of the current date. The stage (1 month ago) characteristic 262 represents the stage of the deal as of one month prior to the current date.

Figure 2C:
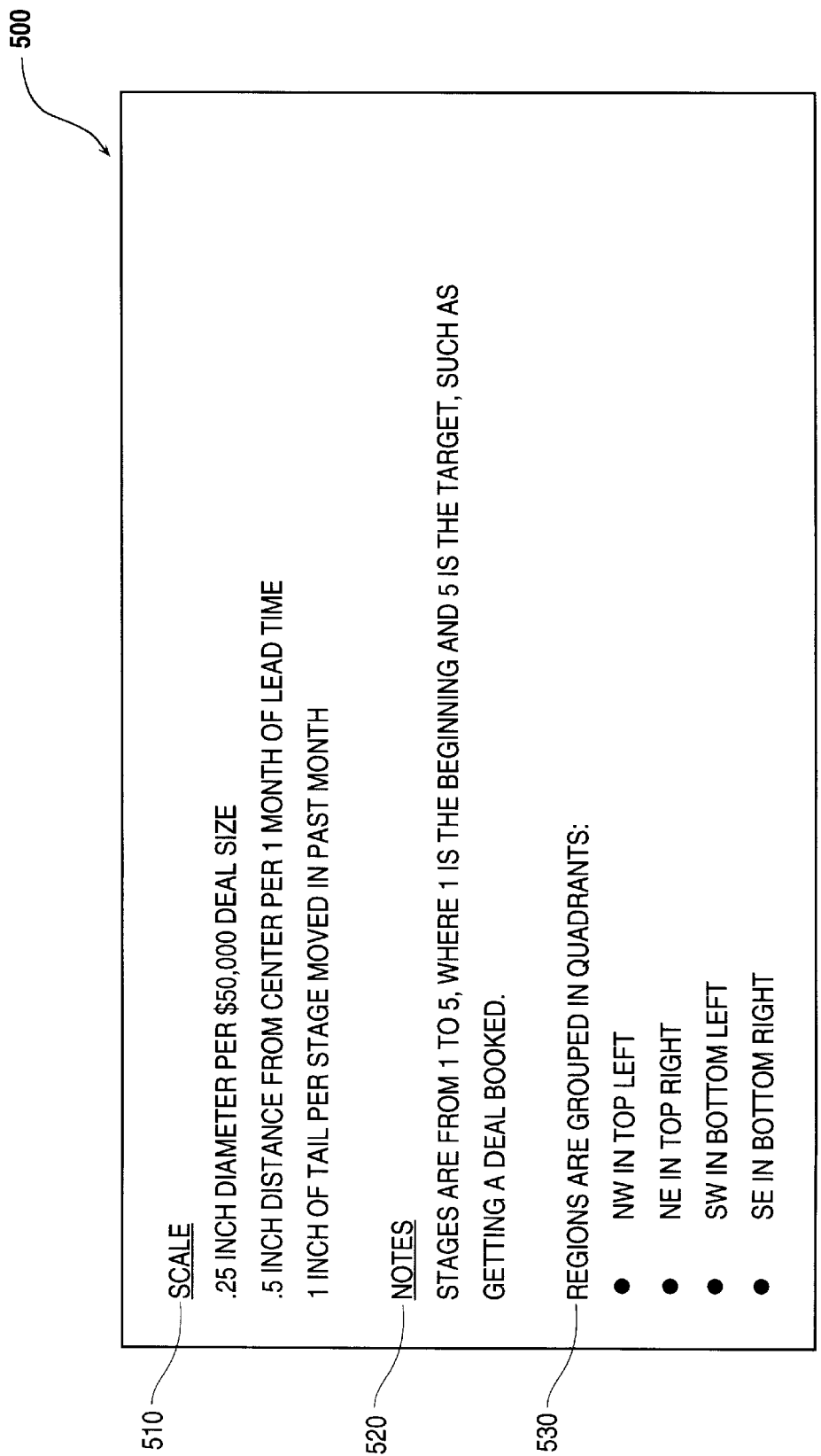
FIG. 2c illustrates scale and note information that accompanies the Radar Screen Opportunity Display of an embodiment of the present invention.

FIG. 2c illustrates example scale and note information 500 that may accompany the RSOD 200 of an embodiment of the present invention. This scale and note information 500 may be displayed along with the RSOD 200, and provides the information necessary to interpret the event characteristics 254–262 from a graphical representation of the event data on the RSOD 200. This scale and note information 400 will be used in the following description of the RSOD display 200. As the event characteristics table 250 contains five event characteristics 254–262 for representation on the RSOD 200, five variables of the event objects will be controlled by these characteristics 254–262. The event object variables controlled in this embodiment include event object size, distance of event object from center of RSOD, event object tail length, direction that event object tail points, and quadrant location of event object. Each of these five event characteristics 254–262 is discussed below with regard to the example RSOD 200 display.

The scale information 510 of FIG. 2c indicates that the event size data 254 is related to the size of the event object 221–227 displayed on the RSOD 200 by the relationship that 0.25 inches of event object diameter equals $50,000 in deal size. Using this example, the ABC Corporation event 270 is represented by a 0.25 inch diameter event object 221, the ACME event 272 is represented by a 0.75 inch diameter event object 222, the Widgets Inc. event 274 is represented by a 1.25 inch diameter event object 223, the XYZ Corporation event 276 is represented by a 0.50 inch diameter event object 224, the Tech Ltd. event 278 is represented by a 1.0 inch diameter event object 225, the Zippy Co. event 280 is represented by a 0.25 inch diameter event object 226, and the Super Stuff event 282 is represented by a 0.75 inch diameter event object 227. The CIMS actually scales to pixels so that the resulting size of the event objects will vary by display device.

The scale information 510 of FIG. 2c indicates that 0.5 inches of distance from the RSOD 200 center 202 represents an estimated one month of lead time, or one month from the current date to the date of closing. Using this example, the ABC Corporation event object 221 is 0.25 inches from the RSOD 200 center 202 representing one-half month until event completion, the Acme event object 222 is 0.5 inches from the RSOD 200 center 202 representing one month until event completion, the Widgets Inc. event object 223 is one inch from the RSOD 200 center 202 representing two months until completion, the XYZ Corp. event object 224 is two inches from the RSOD 200 center 202 representing four months until completion, the Tech Ltd. event object 225 is one and one-half inches from the RSOD 200 center 202 representing three months until completion, the Zippy Co. event object 226 is two inches from the RSOD 200 center 202 representing four months until completion, and the Super Stuff event object 227 is one and one-half inches from the RSOD 200 center 202 representing three months until completion.

Generally, the information displayed by an event object tail is two-dimensional. In this example, the direction in which the tail is pointing indicates qualitatively the direction from which the event has progressed or regressed. Furthermore, the scale information 510 of FIG. 2c indicates quantitative information in that one inch of tail represents one stage moved in the past month. The note information 520 of FIG. 2c indicates that stage 1 is the beginning stage and stage 5 is the target stage, such as getting a deal booked. Using this example, the ABC Corporation event object 221 two-inch tail 241 indicates that the ABC event 270 progressed two stages in the past month, and tail 241 direction indicates that the ABC event 270 progressed towards a target stage. Regarding the Acme event 272, the event object 222 three-inch tail 242 indicates that the Acme event 272 progressed three stages in the past month towards a target stage. Regarding the Widgets Inc. event 274, the absence of an event object 223 tail indicates that the Widgets event 274 did not progress or regress in the past month. Regarding the XYZ Corp. event 276, the event object 224 one inch tail 244 indicates that the XYZ event 276 progressed one stage in the past month towards a target stage. Regarding the Tech Ltd. event 278, the event object 225 one inch tail 245 indicates that the Tech event 278 regressed one stage in the past month away from a target stage. Regarding the Zippy Co. event 280, the absence of an event object 226 tail indicates that the Zippy Co. event 280 did not progress or regress in the past month. Regarding the Super Stuff event 282, the event object 227 two inch tail 247 indicates that the Super Stuff event 282 progressed two stages in the past month towards a target stage.

The sector information 530 of FIG. 2c indicates that the event objects 221–227 are organized in a quadrant 206–212 of the RSOD 200 depending on the geographical location of the event. The quadrants are indicated by quadrant lines 214. Accordingly, the Zippy Co. event 280 and the Widgets Inc. event 274 are in the northeast territory because the Zippy Co. event object 226 and the Widgets Inc. event object 223 are located in the top right quadrant 206 of the RSOD 200. The ABC Corp. event 270 and the Super Stuff event 282 are in the southeast territory because the ABC Corp. event object 221 and the Super Stuff event object 227 are located in the bottom right quadrant 208 of the RSOD 200. The Tech Ltd. event 278 and the XYZ Corp. event 276 are in the southwest territory because the Tech Ltd. event object 225 and the XYZ Corp. event object 224 are located in the bottom left quadrant 210 of the RSOD 200. Finally, the Acme event 272 is in the northwest territory because the Acme event object 222 is located in the top left quadrant 212 of the RSOD 200.

Figure 2D:
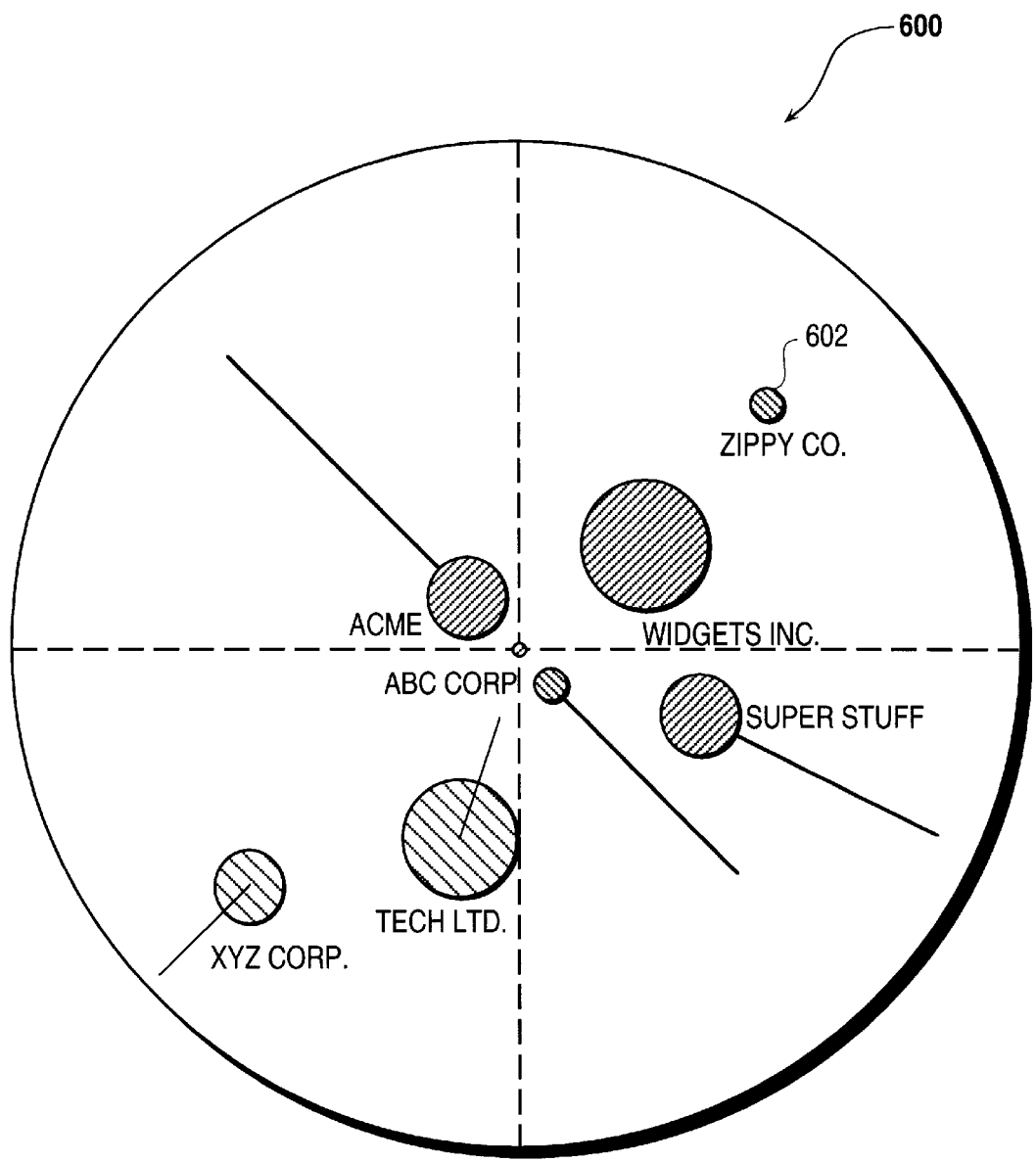
FIG. 2d illustrates another embodiment of a Radar Screen Opportunity Display implemented by the present invention.

FIG. 2d illustrates another embodiment of a RSOD 600 implemented by the present invention. FIG. 2e illustrates a sample table 700 of event characteristics upon which the RSOD 600 implementation of FIG. 2d is based. The RSOD 600 of this embodiment displays event object 602 as an event object with a hollow center. The hollow center of event object 602 is indicative of a lost or failed event. The distance from the center of the RSOD to event object 602 indicates how close the event got to completion before the loss or failure occurred.

Figure 3:
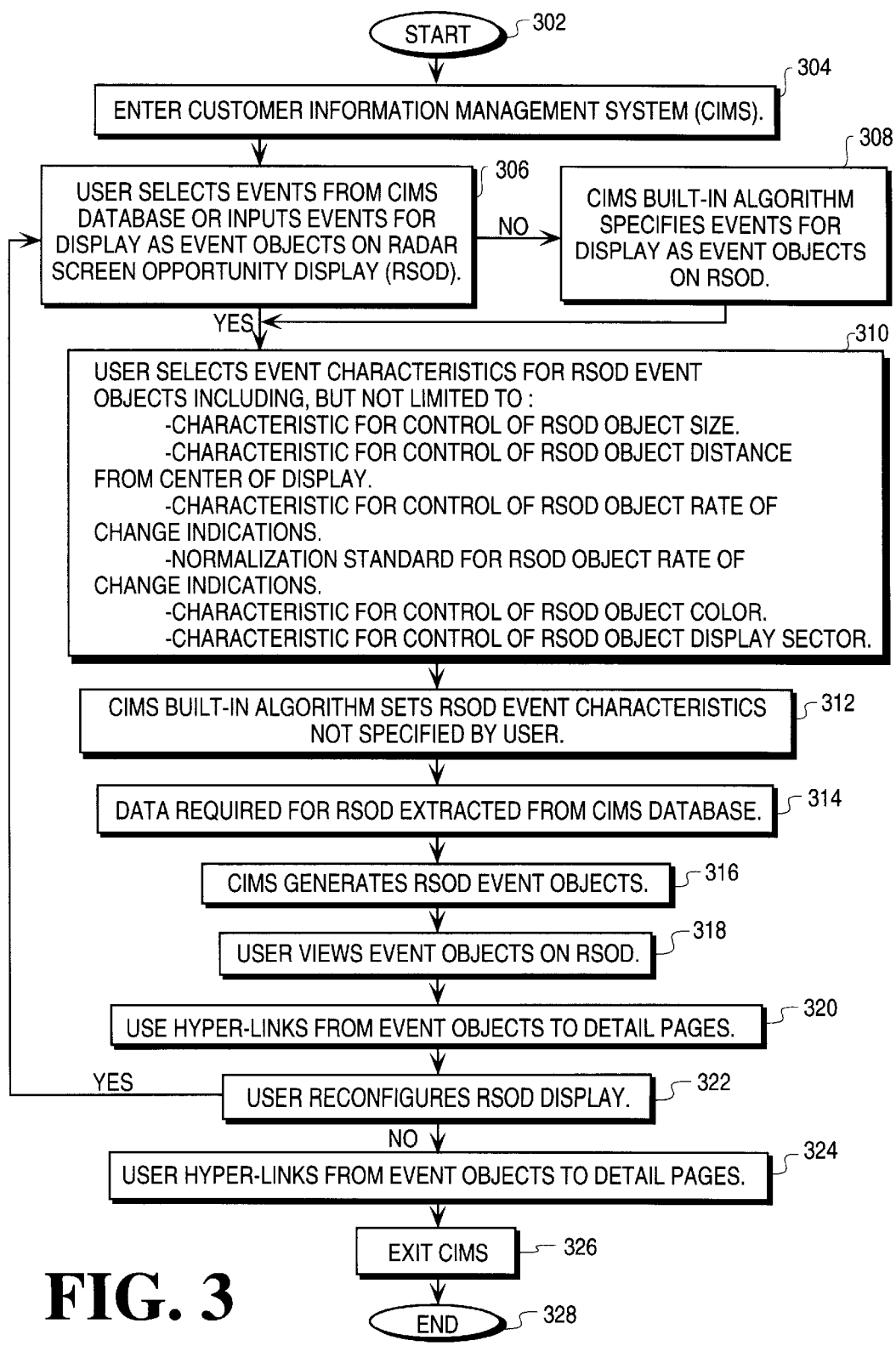
FIG. 3 illustrates a flow diagram for the operation of the Customer Information Management System in an embodiment of the present invention.

FIG. 3 illustrates a flow diagram for the operation of the Customer Information Management System (CIMS) in an embodiment of the present invention. The flowchart starts at block 302. Operation continues at block 304, at which a user enters the CIMS. Operation continues at block 306, at which the user selects an event from the CIMS database for display as a event object on a Radar Screen Opportunity Display (RSOD). The CIMS contains a computer database, or is electronically linked to a computer database. This database contains a record of all company contacts and interactions relating to company events, deals, and transactions with client and customers. This flow diagram presumes that event characteristic data have previously been entered into the CIMS database. The RSOD provides a visual representation of the events in a radar screen format.

In selecting an event from the CIMS for display on the RSOD, the user may select specific events for display. For example, the user might want to see displayed the events of Company A, Company B, Company F, Company R, Company Y, and Company Z. Alternatively, the user may specify events for display on the basis of event characteristics. The event characteristics on which display may be specified include any characteristics of an event that are resident in the database or which are input by the user during a particular CIMS session. For example, a salesperson user might want to display pending sales deals of a certain type based on the dollar value of the deals. Following selection of events for display by the user, operation continues at block 310. If the user does not select any events for display, operation continues at block 308.

If a user does not select any events from the CIMS database for display, operation continues at block 308, at which a built-in algorithm determines the events for display on the RSOD. In the complete absence of user input, the algorithm may select events for display based on, but not limited to, predetermined event characteristics, event characteristics most often requested in prior use by a particular user or group of users, or rate of change of event characteristic trend data. This algorithm may also be configured by the user or by a system administrator in order to display certain events. For example, the user may specify a number or type of event to be displayed, adjust the relative weight of the event characteristics, or indicate which event characteristics should be taken into account in formulating a display.

Following selection of the events for display from the CIMS database, operation continues at block 310, at which the user selects configuration options for RSOD event objects. The CIMS operates by formulating an event object for display based on corresponding event characteristics resident in the CIMS database or input by a user. The size, shape, color, location, and object tail of each event object are determined by event characteristics of a corresponding event. As such, each of these event object attributes are indicative of the event characteristics selected by the user to represent these attributes. Each of these event object attributes will now be discussed.

The size of an event object on the RSOD generally represents, but is not limited to, the relative importance of the corresponding event. As such, the size of the event object represents the size of the potential deal, in revenue or units, or the strategic importance of the deal. The size of the transaction object may also represent the qualitative value of a particular event. In addition, size may represent the probability of closing a transaction, the expected value of a transaction, or the number of interactions with a customer. Event object size may also be used for tracking product defects, product types and releases, assigned representatives, and types of calls. In tracking product defects, event object size can be indicative of the size of the problem and to the number of other defects related to the same problem or same product.

The shape of an event object may be indicative any one of a number of qualitative characteristics of an event. The qualitative characteristics that may be represented by event object shape include, but are not limited to, the category of an event, the assigned company representative, the probability of completing an event, the strategic importance of an event, the product line being sold, the territory, the defects of a product, the industry in which a company deals, and the type of event (e.g., ongoing contract or a one-time sale). The quantitative characteristics of an event that may be represented by event object shape include, but are not limited to, the priority of an event, the value of an event, the time to completion of an event, the size of a company, the size of an event, and the stage of an event. Event object shape may also be used for tracking product defects, product types and releases, and types of calls. Thus, the shape of an event object may be indicative of any characteristic of the transaction found in the database.

The color of an event object may be indicative of any one of a number of qualitative characteristics of an event. The qualitative characteristics that may be represented by event object color include, but are not limited to, the category of an event, the assigned company representative, the probability of completing an event, the strategic importance of an event, the product line being sold, the territory, the industry in which a company deals, and the type of event (e.g., ongoing contract or a one-time sale). The quantitative characteristics of an event that may be represented by event object color include, but are not limited to, the priority of an event, the value of an event, the time to completion of an event, the size of a company, the size of an event, and the stage of an event. As an example, the color of an event object may be red for an event having a highest level of severity with regards to a particular characteristic, blue for an event having a medium level of severity with regards to the particular characteristic, and yellow for an event having a lowest level of severity with regards to the particular characteristic. Thus, the color of an event object may be indicative of any characteristic of the transaction found in the database.

The location of an event object on the RSOD is a multi-dimensional attribute because it is indicative of multiple characteristics of the corresponding event. As such, a radial location of an event object on the RSOD may represent one characteristic of a corresponding event while the sector or grid location of the event object may represent another characteristic of the transaction. For example, a radial location of an event object on the RSOD may represent the stage of a corresponding event, or the length of time a call has been open. Additionally, a sector or grid location of the event object on the RSOD may represent the geographical location of the corresponding event.

Regarding the radial location of an event object, generally a particular point on the RSOD will be chosen to represent a specific stage or date in the lineage of an event. As such, the radial location of an event relative to this particular point may represent the stage of a transaction. For example, in one embodiment the center of the screen is chosen to represent the completion date of an event. The radial distance from the center of the RSOD is thus determined by the stage of the sales pipeline in which an event is currently found relative to a final or target stage. Examples of these discrete stages include, but are not limited to, raw lead, prospect, qualified prospect, field call required, decision pending, booked, shipped, accepted. Alternatively, the radial distance from the center of the RSOD to an event object may be determined by the amount of time between the specified or target date of event completion and the current date. The radial location of an event object may also be determined by the probability of the transaction closing. The CIMS will allow the user to enter pipeline stages or dates for the relative comparison, to choose between choices of stages or dates, or to make no selection of stages or dates in which case the CIMS has default stages and dates.

Regarding the sector location of an event object, the RSOD can be divided into sectors, and the sectors can be selected to represent an event characteristic. For example, the sectors can indicate the sales representative or team which is responsible for an event, the category of the company, the strategic importance of the company, the product line, the product defects, type of call, the size of the company, or the stage of an event in the sales pipeline. The sector representation, however, is not limited to the aforementioned event characteristics.

In addition to the aforementioned event object attributes, each event object may have an object tail. The event object tail is a multi-dimensional indicator of event characteristics. For example, the object tail may represent an aspect of the past history of a particular event. As the object tail has at least two variables, the direction in which the tail points and the tail length, the object tail may represent at least two event characteristics or, alternatively, one two-dimensional event characteristic.

In one embodiment of the present invention, the object tail represents the stage of a particular event relative to a specified stage by indicating the progression or regression of a corresponding event relative to the specified stage. The progression/regression characteristic is a two-dimensional characteristic in that the event can be progressing, or moving towards a specified stage, or the event can be regressing, or moving away from a specified stage. The direction in which the object tail points indicates whether the event is progressing or regressing. The second dimension indicated by the object tail is the associated speed at which the event is progressing or regressing. The length of the object tail indicates the speed at which the event is moving.

In another embodiment of the present invention, the object tail represents the progression or regression of a corresponding event relative to a specified date. In this embodiment, when the event is progressing towards a specified date, the tail of the event object points towards the particular point on the RSOD chosen to represent the specified date of interest. When the event is regressing away from a specified date, the tail of the event object points away from the particular point on the RSOD chosen to represent the specified date of interest. When the event is neither progressing nor regressing, there may be no tail displayed, or a particular type of tail might be displayed to indicate no change in the event. Event progression/regression can be measured by, but is not limited to, comparison to a relevant specified date, stage of event in a pipeline, or increase or decrease in the probability of event closing.

Additionally, the speed associated with the progression or regression of the event is represented by the length of the object tail. The speed can be measured relative to, but is not limited to, a specific date, the speed with which the event passes through a series of stages, by how quickly the probability of event closing fluctuates, or how the time of event closing is adjusted. In order to be representative of speed, the tail length must be normalized relative to a standard. As an example, the tail length can be selected to be normalized relative to all events displayed on the RSOD. Also, the tail length can be normalized relative to some specified period of time (e.g., for the last month). Furthermore, the tail length can be normalized between some particular type of deals of a specified number of deals, whether or not all of these deals are displayed on the RSOD. The normalization standard may be selected by the CIMS user or by a CIMS algorithm.

As the CIMS can display event objects in a way indicative of the past history of a corresponding event, the CIMS may also animate the history of an event. This animation is accomplished by replaying the movement on the RSOD of the event object as reflected by changes in the corresponding characters over a specified period of time. This replay allows the user to view a time history of the progression and regression of an event for a period of interest.

An event object display on the RSOD includes an object label. This label can be input by the user, selected by the user from a list of options supplied by the CIMS, or generated by a default algorithm in the absence of a user selection. The object label displays an attribute of the object from the database. Either the event object label or the event object itself may serve as an electronic link to a detail page containing detailed information about the particular event.

FIG. 4 illustrates a detail page 400 for an embodiment of the present invention. A detail page for each event contains information relating to the particular event. The detail page might include a record of interactions or contacts with the opportunity company. Furthermore, the detail page may include a complete history of interactions with the opportunity company. Moreover, the detail page could be accessed via an address on the worldwide web, or simply a page that displays information that is known within the application about the event. The detail page 400 of FIG. 4 includes as an example of the type of information that might be contained in a detail page, but is not limited to, company name 402, company address 404, company phone number 406, industry in which company participates 408, number of employees 410, revenue 412, credit rating 414, electronic (Internet) address 416, territory 418, deal size 420, expected closing date 422, and stage of the event as of a certain date 424.

Following user selection of configuration options for RSOD transaction objects at block 310 operation continues at block 312, at which a built-in algorithm determines the event characteristics on which the displayed event object size, shape, color, location, and object tail will depend. If the user does not select any characteristics at block 310 to control the display, the algorithm will select all characteristics. If the user selects some characteristics at block 310, the algorithm will select the remaining characteristics. If the user selects all characteristics at block 310 for control of the display, the algorithm will not select any characteristics and operation will continue at block 314. As previously discussed, this algorithm may also be configured by the user in order to display certain events. For example, the user may specify a number or type of event to be displayed, adjust the relative weight of the event characteristics to prioritize which event to display, or indicate which event characteristics should be taken into account in formulating a display.

Following block 312, operation continues at block 314, at which the CIMS loads from a database all event characteristics required for generation of a RSOD of the corresponding events. As previously discussed, the characteristics may be selected by a user or selected by the CIMS.

Operation continues at block 316, at which the CIMS generates the event objects and displays the event objects on the RSOD corresponding to an event. The event objects are displayed according to the event characteristics selected to control the display.

Operation continues at block 318, at which a user views the event objects displayed by the CIMS on the RSOD. Upon viewing the event objects, operation continues at block 320, at which the user may link from specific event objects to corresponding event detail pages. When the user no longer wishes to view a detail page, they may link back to the RSOD display.

Operation continues at block 322, at which, upon viewing the event objects of the RSOD, the user may wish to reconfigure the RSOD to display different events, or the user may wish to reconfigure the RSOD in order to change the event characteristics depicted by the event objects. In this case, operation continues by returning to block 306 whereby the user will have the configuration options as previously discussed. If the user does not wish to reconfigure the RSOD after viewing it, operation continues at block 324, at which the user may link to and from corresponding event detail pages so as to gather information on corresponding events.

When the user completes an information gathering session using the RSOD, the session is complete. Operation then continues at block 326, at which the user exits the CIMS. The flow diagram ends at block 328.

Thus, a method and apparatus for displaying information regarding events have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for displaying information regarding at least one event, comprising the steps of:
    determining said at least one event to be displayed;
    generating for display an event object corresponding to said at least one event;
    displaying said corresponding event object a determined distance from a central point on the display, wherein said determined distance of said event object represents a related stage of a plurality of stages of said event, said central point representing a final stage of the plurality of stages of the event.

2. The method of claim 1, wherein the plurality of stages are temporally related.

3. The method of claim 1, wherein the event reflects a sales deal.

4. The method of claim 1, wherein the event reflects a service to be performed.

5. The method of claim 1, wherein the event reflects a product defect.

6. The method of claim 1, wherein the event reflects a call by a representative.

7. The method of claim 1, wherein said corresponding event is a sales deal, said central point representative of completion, the distance the event object is displayed from the central point indicative of time to completion of the deal.

8. The method of claim 7, wherein the distance is a number of predefined stages away from completion of the deal.

9. The method of claim 7, wherein the distance is an estimated time period away from the completion of the deal.

10. The method of claim 7, wherein the distance is a time a call has been open.

11. The method of claim 7, wherein the distance is a time a defect issue has been open.

12. The method of claim 1, wherein the size of said event object is indicative of a measure of importance of said corresponding event.

13. The method of claim 12, wherein said measure of importance of said event is the amount of money involved in said corresponding event.

14. The method of claim 13, wherein said measure of importance is determined by comparing the expected value of events, said expected value of an event being equal to the probability of completing an event multiplied by the monetary value of the event.

15. The method of claim 12, wherein said corresponding event is a sales deal, and wherein said measure of importance is the monetary value of said sales deal.

16. The method of claim 12, wherein said measure of importance is the number of interactions related to an event.

17. The method of claim 12, wherein said measure of importance is the relative magnitude of a problem corresponding to an event.

18. The method of claim 1, wherein the color of said event object is indicative of at least one characteristic of said corresponding event.

19. The method of claim 18, wherein the color of said event object is indicative of the personnel involved in said corresponding event.

20. The method of claim 18, wherein the color of said event object represents a level of priority of said corresponding event.

21. The method of claim 18, wherein the color of said event object represents the geographical area in which said corresponding event is located.

22. The method of claim 18, wherein the color of said event object represents the strategic importance of said corresponding event.

23. The method of claim 18, wherein the color of said event object represents a product line that is the subject of said corresponding event.

24. The method of claim 18, wherein the color of said event object indicates the corresponding event that has the highest probability of completion.

25. The method of claim 18, wherein the color of said event object indicates the probability of completion of said corresponding event.

26. The method of claim 18, wherein the color of said event object indicates the stage of an event.

27. The method of claim 18, wherein the color of said event object indicates a level of severity of an issue associated with said corresponding event.

28. The method of claim 18, wherein the color of said event object is red for an event having a highest level of severity with regards to a particular characteristic, wherein the color of said event object is blue for an event having a medium level of severity with regards to the particular characteristic, wherein the color of said event object is yellow for an event having a lowest level of severity with regards to the particular characteristic.

29. The method of claim 1, wherein the shape of said event object is indicative of at least one characteristic of said corresponding event.

30. The method of claim 29, wherein the shape of said event object is indicative of the personnel involved in said corresponding event.

31. The method of claim 29, wherein the shape of said event object represents a level of priority of said corresponding event.

32. The method of claim 29, wherein the shape of said event object represents the geographical area in which said corresponding event is located.

33. The method of claim 29, wherein the shape of said event object represents the strategic importance of said corresponding event.

34. The method of claim 29, wherein the shape of said event object represents the product line that is the subject of said corresponding event.

35. The method of claim 29, wherein the shape of said event object indicates the corresponding event that has the highest probability of completion.

36. The method of claim 29, wherein the shape of said event object indicates the probability of completion of said corresponding event.

37. The method of claim 29, wherein the shape of said event object indicates the stage of an event.

38. The method of claim 29, wherein the shape of said event object indicates a level of severity of an issue associated with said corresponding event.

39. The method of claim 29, wherein the shape of said event object represents a type of event.

40. The method of claim 1, wherein said at least one event is displayed as a corresponding animated event object, said animation of said corresponding event object showing the progression and regression of said corresponding event over a specified period of time.

41. The method of claim 1, wherein said displayed event object further comprises an object tail, the length of said object tail indicative of at least one characteristic of said corresponding event.

42. The method of claim 41, wherein the length of said object tail represents a speed at which said corresponding event is progressing or regressing relative to completion.

43. The method of claim 41, wherein the length of said object tail represents a speed at which said corresponding event is progressing or regressing relative to resolution.

44. The method of claim 41, wherein the direction of said object tail is indicative of another characteristic of said corresponding event.

45. The method of claim 42, wherein the direction of said object tail represents the progression or regression of the corresponding event relative to completion.

46. The method of claim 1, wherein said display is divided into a plurality of sectors, the location of said event object in a particular sector representative of at least one characteristic of said corresponding event.

47. The method of claim 46, wherein said sector in which said event object is located identifies the geographical area in which said corresponding event is located.

48. The method of claim 46, wherein said sector in which said event object is located identifies the personnel involved in said corresponding event.

49. The method of claim 46, wherein said sector in which said event object is located represents a level of priority of said corresponding event.

50. The method of claim 46, wherein said sector in which said event object is located represents the product line that is the subject of said corresponding event.

51. The method of claim 46, wherein said sector in which said event object is located indicates the probability of completion of said corresponding event.

52. The method of claim 46, wherein said sector in which said event object is located indicates the stage of an event.

53. The method of claim 46, wherein said sector in which said event object is located indicates a level of severity of an issue associated with said corresponding event.

54. The method of claim 46, wherein said sector in which said event object is located represents a type of event.

55. The method of claim 1, wherein said event object is labeled.

56. The method of claim 1, wherein said event object provides an electronic link to a detail page, said detail page containing information relating to said corresponding event.

57. The method of claim 1, wherein the fill pattern of said event object is indicative of at least one characteristic of said corresponding event.

58. The method of claim 57, wherein an event object has a hollow center, said hollow center indicative of a failed event.

59. A computer system comprising:
a display device;
a processor coupled to said display device, said processor,
configured to determine said at least one event to be displayed;
configured to generate for display an event object corresponding to said at least one event;
configured to display said corresponding event object a determined distance from a central point on the display, wherein said determined distance of said event object represents a related stage of a plurality of stages of said event, said central point representing a final stage of the plurality of stages of the event.

60. The computer system of claim 59, wherein the plurality of stages are temporally related.

61. The computer system of claim 59, wherein an event is a sales deal, said central point representative of completion, the distance the event object is displayed from the central point indicative of time to completion of the deal.

62. The computer system of claim 59, wherein the size of said event object is indicative of a measure of importance of said corresponding event.

63. The computer system of claim 59, wherein the color of said event object is indicative of at least one characteristic of said corresponding event.

64. The computer system of claim 63, wherein the color of said event object is indicative of the personnel involved in said corresponding event.

65. The computer system of claim 63, wherein the color of said event object represents a level of priority of said corresponding event.

66. The computer system of claim 59, wherein the shape of said event object is indicative of at least one characteristic of said corresponding event.

67. The computer system of claim 66, wherein the shape of said event object represents the geographical area in which said corresponding event is located.

68. The computer system of claim 66, wherein the shape of said event object represents the product line that is the subject of said corresponding event.

69. The computer system of claim 66, wherein the shape of said event object indicates the corresponding event that has the highest probability of completion.

70. The computer system of claim 59, wherein said at least one event is displayed as a corresponding animated event object, said animation of said corresponding event object showing the progression and regression of said corresponding event over a specified period of time.

71. The computer system of claim 59, wherein said displayed event object further comprises an object tail, the length of said object tail indicative at least one characteristic of said corresponding event.

72. The computer system of claim 71, wherein the direction of said object tail is indicative of another characteristic of said corresponding event.

73. The computer system of claim 59, wherein said display is divided into a plurality of sectors, the location of said event object in a particular sector representative of at least one characteristic of said corresponding event.

74. The computer system of claim 59, wherein said event object is labeled, and wherein said event object provides an electronic link to a detail page, said detail page containing information relating to said corresponding event.

75. The computer system of claim 59, wherein the fill pattern of said event object is indicative of at least one characteristic of said corresponding event.

76. A system for presenting information, comprising:
at least one event;
an event object corresponding to said at least one event;
a display for presentation of said event object a determined distance from a specific point on said display, wherein said determined distance of said event object represents a related stage of a plurality of stages of said event, said specific point representing a final stage of the plurality of stages of the event.

77. The system of claim 76, wherein the size of said event object is indicative of at least one characteristic of said corresponding event.

78. The system of claim 76, wherein the shape of said event object is indicative of at least one characteristic of said corresponding event.

79. The system of claim 76, wherein the color of said event object is indicative of at least one characteristic of said corresponding event.

80. The system of claim 76, wherein said at least one event is displayed as a corresponding animated event object, said animation of said corresponding event object showing the progression and regression of said corresponding event over a specified period of time.

81. The system of claim 76, wherein said event object is displayed in a graphical manner comprising a plurality of display sectors.

82. The system of claim 76, providing an electronic link to a detail page, said detail page containing information relating to said event.

83. The system of claim 76, wherein the fill pattern of said event object is indicative of at least one characteristic of said corresponding event.

84. A computer readable medium containing executable instructions which, when executed in a processing system, causes the system to perform the steps for displaying information regarding at least one event comprising:
determining said at least one event to be displayed;
generating for display an event object corresponding to said at least one event; and
displaying said corresponding event object a determined distance from a central point on the display, wherein said determined distance of said event object represents a related stage of a plurality of stages of said event, said central point representing a final stage of the plurality of stages of the event.

85. The computer readable medium of claim 84, wherein said plurality of stages are temporally related.

86. The computer readable medium of claim 84, wherein the size of said event object is indicative of at least one characteristic of said corresponding event.

87. The computer readable medium of claim 84, wherein the shape of said event object is indicative of at least one characteristic of said corresponding event.

88. The computer readable medium of claim 84, wherein the color of said event object is indicative of at least one characteristic of said corresponding event.

89. The computer readable medium of claim 84, wherein said at least one event is displayed as a corresponding animated event object, said animation of said corresponding event object showing the progression and regression of said corresponding event over a specified period of time.

90. The computer readable medium of claim 84, wherein said event object is displayed in a graphical manner comprising a plurality of display sectors.

91. The computer readable medium of claim 84, providing an electronic link to a detail page, said detail page containing information relating to said corresponding event.

92. The computer readable medium of claim 84, wherein the fill pattern of said event object is indicative of at least one characteristic of said corresponding event.

93. A method for displaying information regarding at least one event, comprising the steps of:
    determining said at least one event to be displayed;
    generating for display an event object corresponding to said at least one event;
    displaying said corresponding event object a determined distance from a reference point on the display, wherein said determined distance of said event object represents a related stage of a plurality of stages of said event, said reference point representing a final stage of the plurality of stages of the event.

94. The method of claim 93, wherein the plurality of stages are temporally related.

95. The method of claim 93, wherein said corresponding event is a sales deal, said reference point representative of completion, the distance the event object is displayed from the reference point indicative of time to completion of the deal.

96. The method of claim 95, wherein the distance is a number of predefined stages away from completion of the deal.

97. The method of claim 93, wherein the size of said event object is indicative of a measure of importance of said corresponding event.

98. The method of claim 97, wherein said measure of importance of said event is the amount of money involved in said corresponding event.

99. The method of claim 93, wherein the color of said event object is indicative of at least one characteristic of said corresponding event.

100. The method of claim 93, wherein the shape of said event object is indicative of at least one characteristic of said corresponding event.

101. The method of claim 93, wherein said at least one event is displayed as a corresponding animated event object, said animation of said corresponding event object showing the progression and regression of said corresponding event over a specified period of time.

102. The method of claim 93, wherein said displayed event object further comprises an object tail, the length of said object tail indicative of at least one characteristic of said corresponding event.

103. The method of claim 93, wherein said display is divided into a plurality of sectors, the location of said event object in a particular sector representative of at least one characteristic of said corresponding event.

104. The method of claim 93, wherein said event object provides an electronic link to a detail page, said detail page containing information relating to said corresponding event.

105. The method of claim 93, wherein the fill pattern of said event object is indicative of at least one characteristic of said corresponding event.

106. A computer readable medium containing executable instructions which, when executed in a processing system, causes the system to perform the steps for displaying information regarding at least one event comprising:
    determining said at least one event to be displayed;
    generating for display an event object corresponding to said at least one event; and
    displaying said corresponding event object a determined distance from a reference point on the display, wherein said determined distance of said event object represents a related stage of a plurality of stages of said event, said reference point representing a final stage of the plurality of stages of the event.

107. The computer readable medium of claim 106, wherein said plurality of stages are temporally related.

108. The computer readable medium of claim 106, wherein the size of said event object is indicative of characteristics at least one characteristic of said corresponding event.

109. The computer readable medium of claim 106, wherein the shape of said event object is indicative of characteristics at least one characteristic of said corresponding event.

110. The computer readable medium of claim 106, wherein the color of said event object is indicative of characteristics at least one characteristic of said corresponding event.

111. The computer readable medium of claim 106, wherein said at least one event is displayed as a corresponding animated event object, said animation of said corresponding event object showing the progression and regression of said corresponding event over a specified period of time.

112. The computer readable medium of claim 106, wherein said event object is displayed in a graphical manner comprising a plurality of display sectors.

113. The computer readable medium of claim 106, providing an electronic link to a detail page, said detail page containing information relating to said corresponding event.

114. The computer readable medium of claim 106, wherein the fill pattern of said event object is indicative of characteristics at least one characteristic of said corresponding event.

* * * * *